United States Patent
Waldhauser et al.

Patent Number: 5,762,196
Date of Patent: Jun. 9, 1998

[54] STACKABLE DRAWN PIECES

[75] Inventors: Franz Waldhauser, Sindelfingen; Wolfgang Much, Dettenhausen, both of Germany

[73] Assignee: Mercedes-Benz AG, Germany

[21] Appl. No.: 782,102

[22] Filed: Jan. 13, 1997

[30] Foreign Application Priority Data

Jan. 11, 1996 [DE] Germany ............ 196 00 755.0

[51] Int. Cl.$^6$ .................................... B65D 21/00
[52] U.S. Cl. ................. 206/499; 206/518; 220/628
[58] Field of Search ............. 220/628; 206/499, 206/518, 519

[56] References Cited

U.S. PATENT DOCUMENTS

| | | | |
|---|---|---|---|
| 1,690,073 | 10/1928 | Kincaid | 206/518 |
| 2,704,974 | 3/1955 | Setman | 206/518 X |
| 3,568,830 | 3/1971 | Moren | 206/499 |
| 3,589,511 | 6/1971 | Britt | 206/518 |
| 4,114,417 | 9/1978 | LaVene | |
| 4,644,775 | 2/1987 | Fuchs, Jr. | |
| 4,936,457 | 6/1990 | Kicherer et al. | 206/499 |

FOREIGN PATENT DOCUMENTS

| | | |
|---|---|---|
| 899707 | 9/1984 | Belgium . |
| 1 567 846 | 5/1969 | France . |
| 2 031 527 | 11/1970 | France . |
| 2 654 075 | 5/1991 | France . |
| 43 12 287 C1 | 11/1994 | Germany . |
| 62-176618 | 8/1987 | Japan . |
| 500 024 | 1/1971 | Switzerland . |

Primary Examiner—Steven M. Pollard
Attorney, Agent, or Firm—Evenson, McKeown, Edwards & Lenahan, P.L.L.C.

[57] ABSTRACT

Stackable drawn sheet-metal pieces have spacer knobs which are drawn in a bead-type manner and are integrated in the drawn piece to rise from a wall of the drawn piece. The walls of the drawn piece situated transversely to a stacking direction have a mutual distance such that the walls, which are situated at an acute angle with respect to the stacking direction of the drawn piece, are at most in a loose contact with one another and reliably engage with one another in a no-lock manner. The spacer knobs are arranged in the stack above one another in the same position have a common axis which extends approximately in the center and is situated parallel to the stacking direction. The spacer knobs have the same construction with respect to their dimensions and alignment and that the diameter of the respective knob opening on at least one partial circumferential area is smaller than the diameter of the knob base. The diameter and the construction of the knob base and of the knob opening in this partial circumferential area are coordinated such that the drawn piece come to rest on one another in the stack in a manner which is stable in terms of tilting.

3 Claims, 4 Drawing Sheets

STACKABLE DRAWN PIECES

BACKGROUND AND SUMMARY OF THE INVENTION

The present invention relates to stackable drawn pieces as well as to a process and to an arrangement for manufacturing these pieces. In particular, the present invention relates to stackable drawn pieces made of sheet metal, having spacer knobs which are integrated in the drawn piece and are drawn in a bead-type manner and which rise from the wall of the drawn piece, which is situated transversely to the stacking direction. Thereby, the walls of the drawn piece situated transversely to the stacking direction have such a mutual distance that the walls, which are situated at an acute angle with respect to the stacking direction of the drawn pieces, come at most in a loose mutual contact and reliably engage in one another in a no-lock manner, the spacer knobs being arranged on the drawn pieces in the same position.

The present invention further relates to a process for manufacturing stackable drawn sheet-metal pieces, comprising the steps of deep-drawing blanks to a trough-shaped form, and drawing in the drawn blank bead-type spacer knobs which rise from a wall of the finished deformed at least one drawn piece, which is situated transversely to a stacking direction, such that walls of the at least one drawn piece extending transversely with respect the stacking direction are spaced and walls situated at an acute angle with respect to the stacking direction have, at most, a loose mutual contact and reliably engage in one another in a no-lock manner, the spacer knobs being situated above one another in a stack in the same position. An apparatus for manufacturing stackable drawn sheet-metal pieces comprises a drawing punch and a die for shaping the drawn pieces, a plurality of knob drawing punches and knob dies integrated therein for the molding-on of spacer knobs, the mutually facing front sides of each of the knob drawing punch and of the knob die being arranged in corresponding positions and constructed in a negative-mold-type fashion with respect to one another.

Drawn pieces as well as a process and an arrangement for manufacturing them are described in DE 43 12 287 C1. In order to prevent a locking of the drawn pieces, a rotary punch is provided for forming spacer knobs with an assigned rotary drive which, starting from a first drawn piece to be provided with spacer knobs, has a different rotating position at least in the case of the drawn piece to be deformed next. By way of the different alignment of the bead-type spacer knobs at mutually next or next but one adjacent drawn pieces, a locking of the drawn pieces in the stack is prevented.

The manufacturing and the control of the rotary punch requires, however, relatively high expenditures. Also, in a test inspection of several successive drawn pieces, the stacking must be interrupted because it is not certain whether the drawn piece to be stacked next has spacer knobs which are constructed such that this drawn piece will not lock in the up to now uppermost drawn piece.

It is an object of the present invention to provide an improved drawn piece and the apparatus and process for manufacturing the drawn piece so that a stacking without any locking of the drawn pieces can be more simply accomplished.

According to the present invention, this object has been achieved by providing that the spacer knobs are disposed above one another in the stack, and have the same dimensioning and alignment, and a diameter of a respective knob opening, on at least one partial circumferential area, is smaller than a diameter of the spacer knobs in an area of a free knob end. In addition, an area of a free end of the spacer knobs disposed above one another in the stack and, with respect to their dimensions and alignment, have the same construction is internally expanded with respect to a knob opening.

According to an improved arrangement, each knob drawing punch and each knob dies for the molding-on of the spacer knobs are non-rotatably arranged and at least each knob drawing punch is axially movably guided, and a deforming device for radial expansion of a knob base with respect to a knob opening, each knob die being provided with a recess for forming out of the spacer knob which is undercut.

As the result of the advantageous features of the present invention, a rotary drive for the rotary punch producing the spacer knobs as well as its rotary bearing are eliminated. For this purpose, the spacer knobs have identical shapes for all drawn pieces, with the same dimensions and the same alignment. Then devices are used which deform the identically constructed spacer knobs such that, by way of the different diameters of the knob opening and the knob base or the free end of the spacer knobs, a locking of the deformed drawn pieces during stacking is prevented.

The uniform construction of the mutually non-lockable drawn pieces allows removal of several drawn pieces successively from the manufacturing operation for testing without the necessity of interrupting the further stacking operation. For drawn pieces with a high degree of deformation difficulty, such as inside door panels, the deformation of the spacer knobs takes place particularly efficiently because these drawn pieces must be drawn in several operating steps (steps, or strokes) and thus a deformation is possible which is parallel to these operating steps. The spacer knobs can be drawn in a separate drawing operation during the first deforming steps of the drawn piece or simultaneously with a deforming step which concerns the shaping of the drawn piece.

BRIEF DESCRIPTION OF THE DRAWINGS

These and other objects, features and advantages of the present invention will become more readily apparent from the following detailed description of currently preferred embodiments when taken in conjunction with the accompanying drawings wherein:

FIG. 2b is a sectional view of the spacer knob along line IIb—IIb of FIG. 2a;

FIG. 3b is a sectional view of a segment of the expansion punch along line IIIb—IIIb of FIG. 3a;

FIG. 7b is a side sectional view of the spacer knob along line VIIb—VIIb of FIG. 7a and;

DETAILED DESCRIPTION OF THE DRAWINGS

Figure 1:
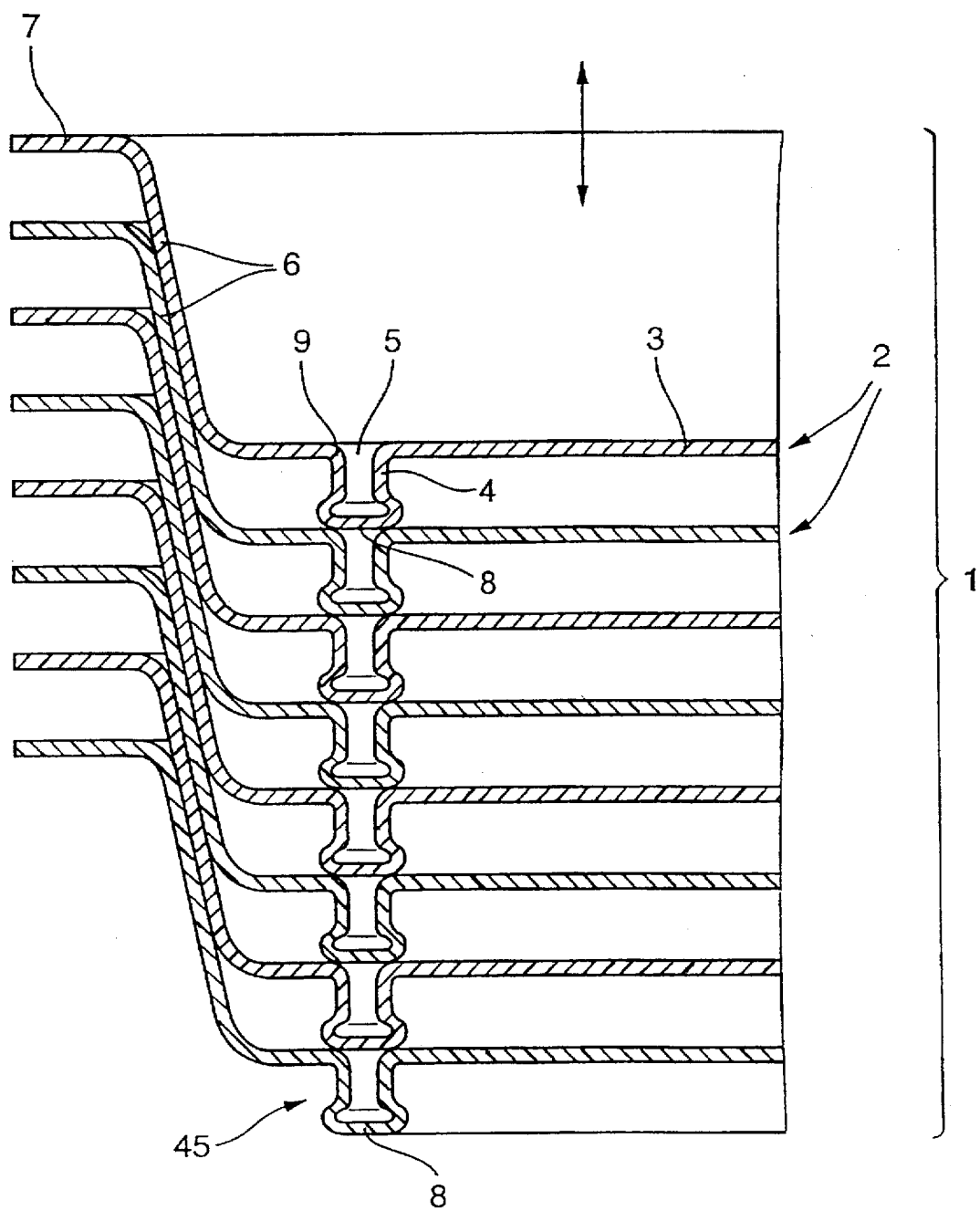
FIG. 1 is an elevational cross-sectional view of a stack of drawn pieces with superimposed spacer knobs constructed according to the present invention.

FIG. 1 illustrates a stack (collectively bracketed) designated generally by numeral 1 of trough-shaped drawn pieces 2 made of a drawable material, preferably of sheet metal or plastic, which are placed in one another in the stacking direction (double arrow) on top of one another. Walls 3 of the drawn pieces 2 which are situated transversely to the stacking direction have bead-shaped spacer knobs 4 which project vertically downward and space one drawn piece away from another drawn piece situated underneath. Instead of projecting vertically downward, the spacer knobs 4 can also project vertical upward.

The spacer knobs 4 of the pieces 2 stacked on one another are arranged at the same site with respect to one another. Thus, one knob 4 respectively is disposed on the wall 3 of the drawn piece 2 situated underneath and, by way of its knob base 8, projects over the edge 9 of the knob opening 5 of this drawn piece at least one two opposite points which prevents a locking of the knobs in one another. For this purpose, the knob base 8 has a larger diameter than the knob opening 5 in such a manner that, during the stacking and in the stack, the drawn pieces come to rest upon one another in a stable manner with respect to tilting.

The height of the spacer knobs 4 is such that the lateral walls 6 of the drawn pieces 2 which adjoin the walls 3 and are bent away therefrom in an acute angle contact one another only loosely so that the bent edge 7 which is situated in parallel to the walls 3 is spaced away from the edges of the next drawn pieces 2. Thereby, a separating of the pieces from one another can be carried out without any problems. Because of the special construction of the spacer knobs 4 or the larger diameter of the knob base 8 with respect to that of the knob opening 5, occasionally a single drawn piece 2 can be taken out of the continuous manufacturing operation or out of the stack 1 without any locking of the next following drawn piece with the piece situated underneath.

The drawn pieces 2 may, for example, be inside door panels which, as a rule, have a difficult degree of deformation. The inside door panels have punched holes for receiving bolts so that, with respect to the appearance of the overall surface of the inside door panel and because of the few existing application surfaces on the inside door panel, it is particularly advantageous to punch out the spacer knob 4 at the point where the punched holes are to be produced and then punch the hole out in the knob base 8.

FIGS. 2 to 7 show several approaches for producing the different diameters of the knob opening 5 and the knob base 8. In FIG. 2a, for example, after the drawing of the respective spacer knob 4, a expansion punch 10 with a cylindrical section 17 is moved into the spacer knob 4, which is still inside the drawing die 11, until the front side 12 of the expansion punch 10 reaches the knob base 8. A central duct 13 extends in the expansion punch 10 for guiding a fluid, such as water, oil or an inert gas, which is divided into two feeding ducts 14 close to the front side 12 of the expansion punch 10. These feeding ducts 14 extend radially to the punch axis 13 and lead out in openings 16 in the area of the knob base 8 arranged on the circumference of the expansion punch 10. The duct 13 is connected with a pressure medium source so that a fluid pressure is generated and the spacer knob 4 is radially expanded in the area of the openings 16. For this purpose, the drawing die 11 has a recess 18 at these points so that the drawn part material can be displaced thereinto.

Figure 2A:
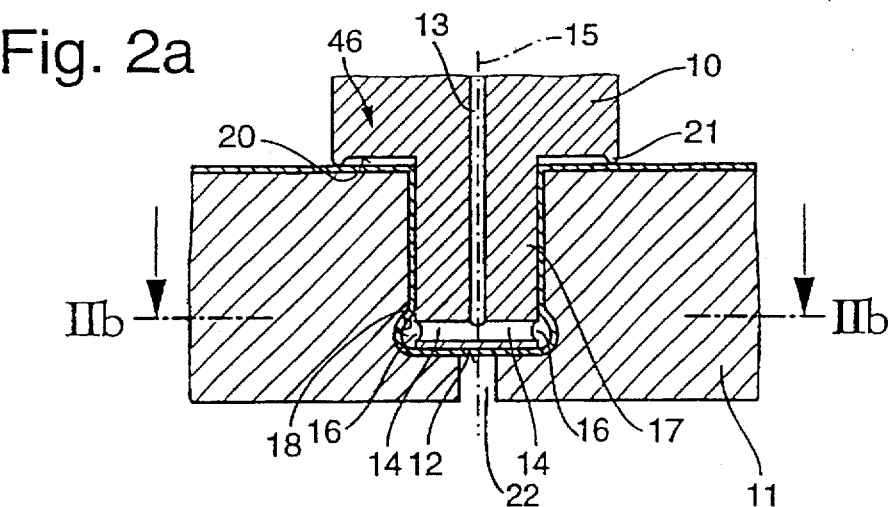
FIG. 2a is a side longitudinal view of the expansion punch for the spacer knobs with radial openings arranged on the end side, during the deforming of the drawn spacer knob.
Figure 2B:
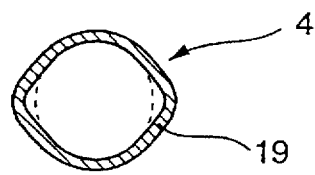

As illustrated in FIG. 2b, an oval 19, which carries in it the base circle of the cylinder, is shaped out of the diameter in the area of the knob base 8, which diameter was originally of the same size along the entire length of the spacer knob and also was uniformly cylindrical. The diameter of the knob base 8 is therefore enlarged with respect to the knob opening 5. Outside the spacer knob 4, the expansion punch 10 is radially widened while forming a ring-shaped surrounding step 20 on its root 46, in which case the step 20 has a torus 21 which projects to the drawing die 11 and which presses the drawn piece 2 against the drawing die 11 in the manner of a holding-down clamp. At the same time, the torus 21 has an additional sealing effect with respect to the fluid pressure so that, on one hand, during the deforming of the knob base area, a pressure drop as the result of a leakage flow and thus a non-uniform deformation is prevented and, on the other hand, an uncontrolled emerging of fluid and thus a fluid quantity loss is prevented.

On the bottom side of the knob base 8, the drawing die 11 has a passage bore 22 which is concentric to the knob base 8. Through this passage bore 22, a stamping punch can be guided onto the knob base 8 in order to punch the above-mentioned receiving hole for the receiving bolt thereout of. The knob base 8 may in this and the other embodiments have a prepunched opening which, however, has a much smaller diameter than the knob opening 5. It facilitates an expansion of the area of the knob base 8, thus of the free end 45 of the spacer knob 4. In this particular embodiment, however, the expansion punch 10 must rest by its front side 12 with a high force against the knob base 5 in order to avoid an escape of pressure fluid from the knob.

Figure 3A:
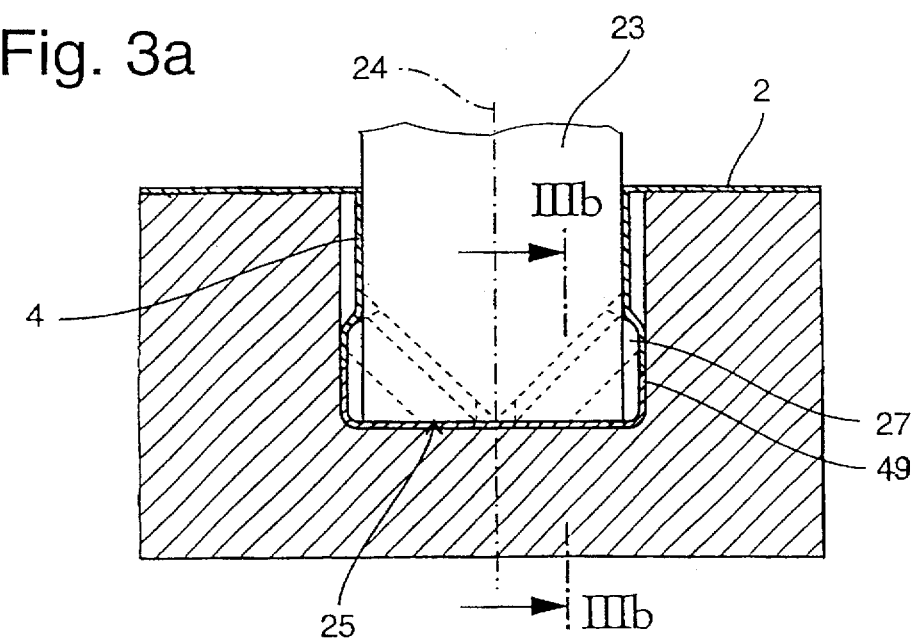
FIG. 3a is a side longitudinal sectional view of the expansion punch for the spacer knobs with slides arranged on the end side, during the deformation of the drawn spacer knob.
Figure 3B:
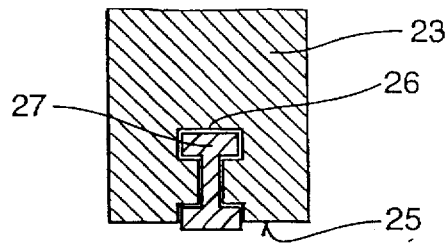

In FIG. 3a, the expansion punch 23 has two guide ducts 26 which are situated opposite one another with respect to the punch axis 24 and extend diagonally, preferably at 45°, from the front side 25 of the expansion punch 23—close to the axis—continuously to its circumference and in which one diagonal slide 27 respectively is guided so that it cannot be lost. In the inoperative position, the diagonal slide 27 projects out of the front side of the expansion punch 23 and is secured by a surrounding retaining ring or by a spring against a sliding out of the guide duct 26 in a starting position. As seen in FIG. 3b, the diagonal slide 27 and the guide duct 26 are configured in an H-shape rotated by 90° but can also have a T-shaped construction.

When the expansion punch 23 dipping into the spacer knob approaches the knob base 8, the diagonal slides 27 by way of their front side 25 first impact thereon, after which the slides 27 in their guides 26 are pushed diagonally to the outside and upwards. As a result, the spacer knob 4 is expanded in the area of the knob base 8, in which case, at the points of the duct openings in the circumference of the expansion punch 23, the drawing die 11 in each case has a recess 49 into which the drawn piece material can be displaced. The recess 49 extends from the knob base 8 to the knob opening 5 in an axially continuous manner so that the deformed knob 4 can easily be removed from the drawing die 11. Analogously to the embodiment of FIGS. 2a and 2b, the diameter of the knob base 8 or of the area of the free end 45 of the spacer knob 4 is enlarged to an oval with respect to the knob opening 5 on two opposite partial circumferential areas of the spacer knob 4 by the effect of the slide.

Figure 4:
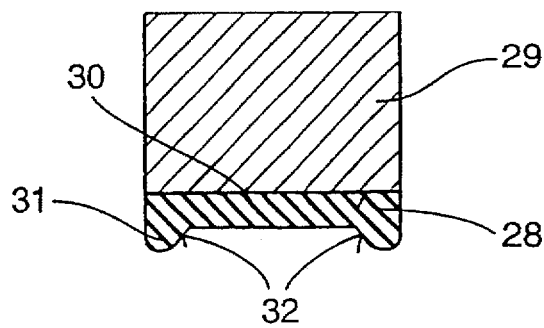
FIG. 4 is a side longitudinal sectional view of the expansion punch for the spacer knobs with an elastically acting plate which is arranged on the end side and has beads which can be pushed to the outside.

In FIG. 4, a plate 30 made of an elastic material, preferably of hard rubber, is mounted on and covers the front side 28 of the expansion punch 29. At its edge, the plate 30 has two beads 31 whose interior flanks 32 are chamfered such that, when the knob base 8 is axially acted upon by the expansion punch 29, the beads 31 are pressed radially to the outside and the plate 30 is pressed flat, whereupon the drawn piece material which is situated there is pressed toward the outside. On the die-side, at the point of the beads 31, the recess 18 of the drawing die 11 is each arranged in the operative position of the punch 29. The plate can also be constructed as an arbitrarily configured rubber cushion.

Furthermore, it is within the scope of the present invention to achieve an expansion in the area of the knob base 8 by an expansion punch in which a slide is arranged which has a slide axis which is parallel to the punch axis. The slide can be moved in the axial direction and is preferably situated coaxially with respect to the punch. In the inoperative position, the slide projects over the front side of the punch and is in an operative connection with two swivel slides which are rotatably disposed in the punch and which have an identical axis of rotation and, via their free end, close off flush with the circumference of the punch in the area of the front side. When the punch approaches the knob base 8, the slide, which can be moved in the axial direction, first impacts thereon and, as a result, the knob base 8 is pushed into the punch whereupon both swivel slides are actuated simultaneously. Then, under the adjusting force of the slide situated in the center, the swivel slides swivel out of the punch by way of their free end. As a result of the swivelling-out of the swivel slides, the material of the space knob situated there is pushed to the side where, the drawing die 11 has the recess 18 at the site of the free ends of the swivel slides. The material of the knob 4 or of the drawn piece 2 is pushed into the recess 18.

Furthermore, it is within the scope of the present invention to place a cartridge with an explosive content in the spacer knob 4 situated in the drawing die 11. When the expansion punch impacts on the cartridge, the cartridge will ignite, whereupon the material of the spacer knob 4 in the area of the knob base will be pressed into the recess 18 of the drawing die 11 under the effect of the explosive pressure.

Furthermore, a lamina made of an easily deformable material, such as lead, tin, aluminum, plastic or rubber, can be placed in the spacer knob 4 so that after the punch dips into the spacer knob 4, the punch presses a partial volume of the soft insertion material radially to the outside into the recess 18 of the drawing die 11. Thereby, corresponding to the preceding embodiments, the punch enlarges the diameter of the knob base 8 in comparison to the knob opening 5.

FIGS. 5 and 7a–c show embodiments in which the deformation concerns the knob opening rather than the knob base 8 of the drawn spacer knob 4. The knob base 8 or the area of the free end 45 of the spacer knob 4 retains its original diameter, while the diameter of the area of the knob opening 5 is reduced at least on two partial circumferential areas of the spacer knob 4.

Figure 5:
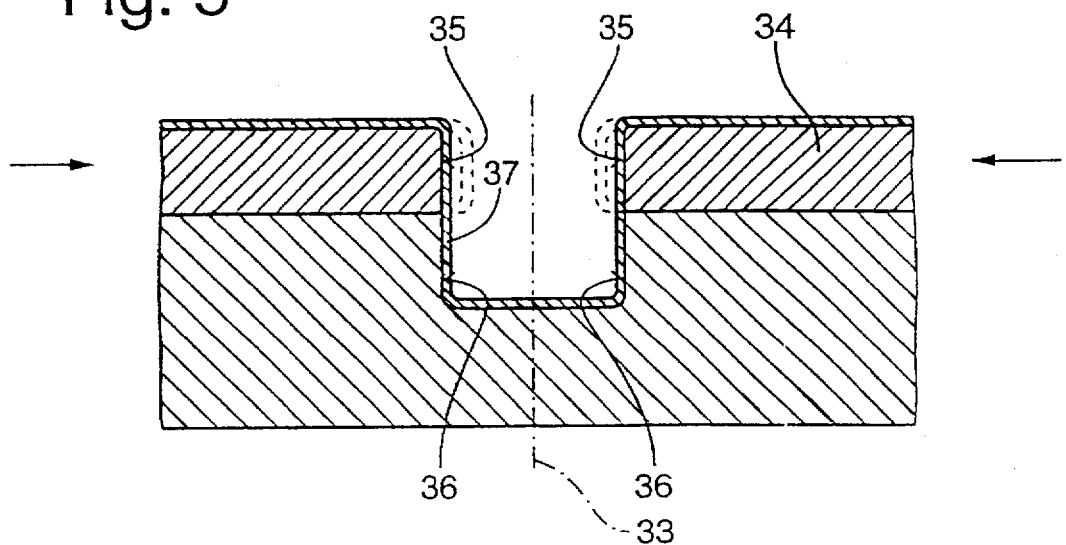
FIG. 5 is a side longitudinal sectional view of the drawn spacer knob and two lateral deformation slides.

In FIG. 5, in a departure from the above-described expansion punch, the deformation devices consist of two slides 34 which are arranged opposite the knob axis 33. The slides 34 can be moved transversely to the axis 33, i.e. radially movable, and are integrated into the drawing die 11 for the spacer knobs 4. The mutually facing front sides 35 of the slides 34 form, in the inoperative position, a portion of the engraving wall 36 of the drawing die 11. For deforming the spacer knob 4, the slides 34 are guided toward one another in the direction of the arrows, whereby the cylindrical knob neck 37 is compressed in the area of the knob opening 5 and thereby is brought into a dented end position illustrated by a dashed line. During the deformation, the drawn piece 2 is held by a conventional hold-down clamp on the drawing die 11 to prevent the surface of the drawn piece 2 surrounding the spacer knob 4 from being deformed under tension.

Figure 6:
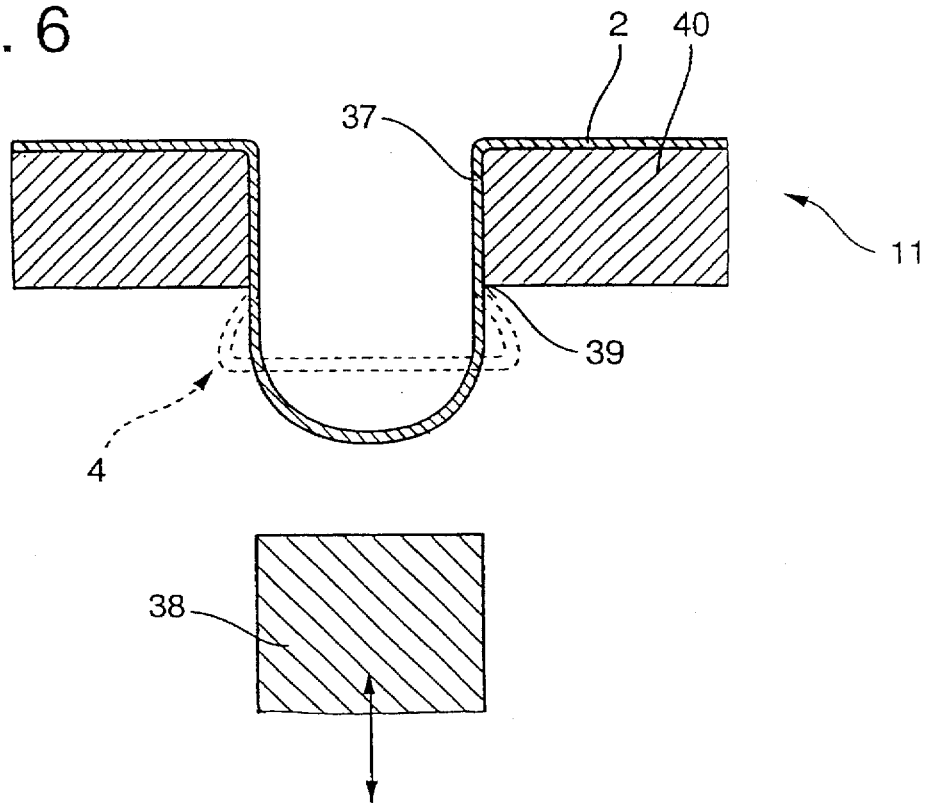
FIG. 6 is a side longitudinal sectional view of the drawn spacer knob and of a counterpunch which can be moved coaxially thereto.

In FIG. 6, the spacer knob 4 is drawn by a drawing punch with a spherically constructed front side so that the knob base 8 of the spacer knob 4 is shaped correspondingly spherically or crowned. The drawing die 11 is divided into an upper and a lower part, in which case the engraving which, in a negative-mold-type manner, corresponds to the front side of the drawing punch is worked into the lower part. The lower part of the drawing die 11 (not shown) was moved out of the deforming area for deforming the knob base 6. The separating line of the die parts is situated approximately at the level of the transition of the spherical knob base 8 to the cylindrical knob neck 37.

For the deformation operation, a counterpunch 38, which forms the deformation device, is guided onto the knob base 8 and can be moved in a slidably movable manner according to the double arrow coaxially with respect to the drawing punch and presses the knob base 8 of the spacer knob 4 immovably held by a clamp-down device on the drawing die 11, back in the axial direction in an upsetting movement. The material of the spacer knob 4 yields laterally in a uniform manner, with the lower edge 39 of the upper die part 40, which bounds the spacer knob 4, forming a bending edge for the part of the spacer knob 4 displaced by the counterpunch 38.

The bending edge facilitates a targeted deformation toward the side. The diameter of the knob base 8 is therefore enlarged with respect to the knob opening 5. The upsetting of the knob base 8 or of the free end 45 of the preformed, essentially cylindrical spacer knob 4 is also conceivable inside a drawing die 11 enclosing the drawn spacer knob 4, in which case, however, corresponding recesses 18 must be provided therein.

Also, the upsetting can take place by the cooperation of the counterpunch with the drawing punch, in which situation its front side does not necessarily have a spherical construction. With mutually facing plane front sides of the drawing punch and the counterpunch, a widening of the plane knob base 8 takes place with a reduction of its wall thickness. Also, a displacement cushion made of a soft elastic material or as an elastic swelling body filled with a fluid may exist on the front side of the drawing punch.

Figure 7A:
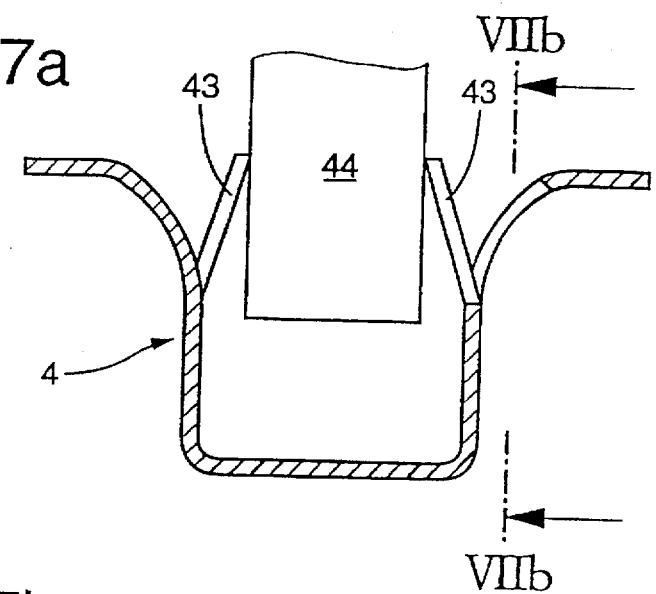
FIG. 7a is a side longitudinal sectional view of the drawn spacer knob with longitudinally extending incisions and a counterholder.
Figure 7B:
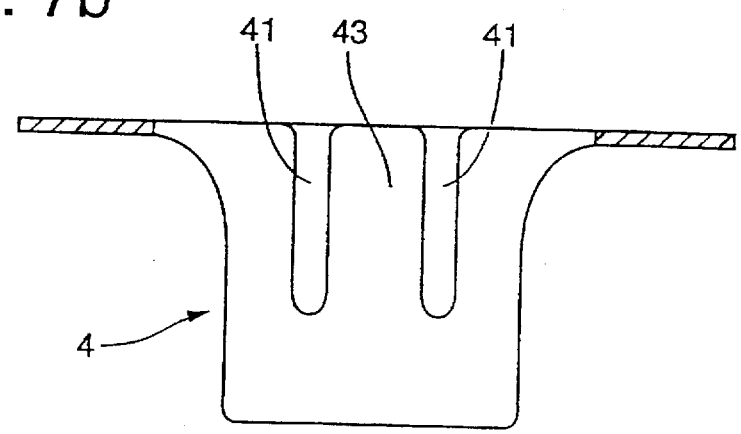
Figure 7C:
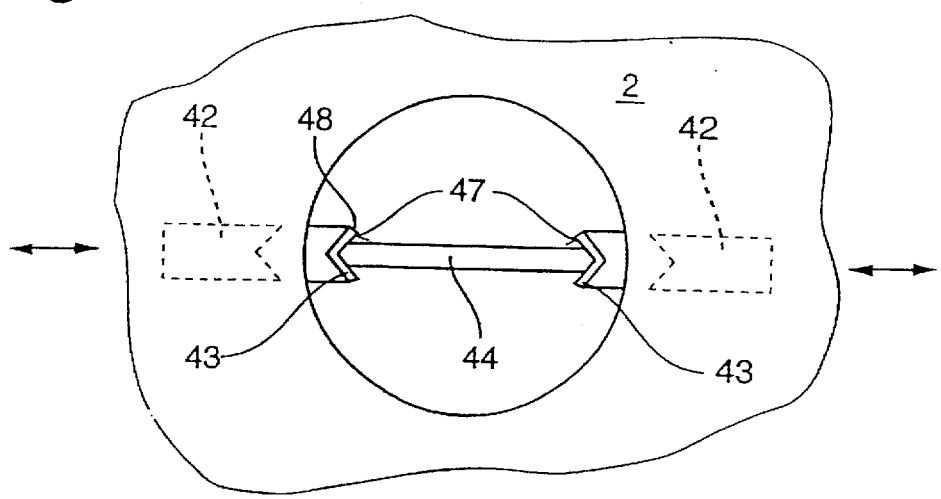
FIG. 7c is a top view of the spacer knob of FIG. 7a with two slides which can be moved transversely to the drawing direction of the spacer knob.

In FIGS. 7a–c, the drawn spacer knob 4 is provided with two respective vertical incisions 41 on two opposite partial circumferential areas by way of a cutting tool, which is contained in the tool content of the manufacturing device for the spacer knob 4 (FIG. 7b). The incisions 41 are spaced side-by-side at a narrow distance and extend along the knob neck 37. The incisions 41 also start out from the opening edge 9 of the knob opening 5 and extend to the knob base 8. The deformation devices are two slides 42 (FIG. 7c) which are movable transversely to the knob axis 33 for bending the sheet metal tongues bounded by the incisions 41 toward the knob axis 33.

For a defined bending position and thus for a defined adjustment of the diameter of the knob opening 5 on the deformed partial circumferential areas, a counterholder 44 dips axially into the spacer knob 4, so that the sheet metal tongues 43 are bent so far toward the inside that the rest against the counterholder 44 (FIGS. 7a and c). This embodiment is particularly advantageous in the case of drawn spacer knobs 4 which, in order to be drawn more easily and in order to avoid sheet metal tears in the drawn piece 2 at the site of the spacer knob 4, have generously rounded-out drawing radii. The bent sheet metal tongues 43 compensate for the stack height which is reduced by such drawing radii. In addition, it is possible for the cutting tool to be formed by the slides 42 whose V-shaped front sides 47 are provided with a surrounding edge-forming cutting edge 48.

For producing the drawn pieces 2, it is conceivable to first deep-draw these in a trough-shaped form and to simultaneously draw the spacer knobs 4. Here, the drawing dies for the spacer knobs 4 are integrated in the drawing die for the trough-shaped form and can be connected therewith in one piece or can be axially movably guided therein. It is also within the contemplation of the present invention to subsequently form the spacer knobs 4 in an additional drawing operation which can take place parallel to another deformation operation of the drawn piece.

The deformation of the drawn spacer knob 4 according to the present invention can also already take place parallel to the deformation operations of the drawn piece 2. If the drawing die 11 has no recess 49, the drawing die 11 must be constructed at least in two parts for removing the drawn piece 2 provided with undercut spacer knobs 4 without any problem. Thus, the separating line of the die parts must extend vertically and inside the respective spacer knob 4. Likewise, it is necessary for the removal that the die parts can be slid laterally apart and together.

The drawing punch for the spacer knob 4 and the expansion stamp responsible for its deformation can be identical. This excludes, however, the variants in which a radial expansion operation takes place by an axial action upon the knob base by the front side of the expansion punch. During the drawing of the spacer knob 4, the drawing punch would otherwise simultaneously have an expanding effect, when impacting on the drawn piece, and this could fundamentally interfere with the drawing operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. At least one stackable drawn sheet-metal piece having a sidewall and a bottom forming an interior having integral spacer bead-type drawn knobs extending from said bottom of the at least one drawn piece situated transversely to a stacking direction and extending away from said interior, said knobs being hollow and opening to said interior, the bottom of the at least one drawn piece situated transversely to the stacking direction having a mutual distance such that the walls of the at least one piece is arranged at an acute angle with respect to the stacking direction so that adjacent drawn pieces are, at most, in a loose mutual contact with each other and reliably engage in one another in a no-lock manner with the spacer knobs being located in the same position on the drawn pieces, wherein the spacer knobs are disposed above one another in the stack, and have the same dimensioning and alignment, and the diameter of said respective knob opening, on at least one partial circumferential area, is smaller than a diameter of the spacer knobs in an area of a free knob end.

2. The at least one stackable drawn piece according to claim 1, wherein the diameter of the knob opening on two opposite partial circumferential areas of the spacer knob is smaller than a diameter of a knob base.

3. The at least one stackable drawn piece according to claim 2, wherein the knob base has a central opening.

* * * * *